United States Patent
Caria et al.

(10) Patent No.: US 11,187,664 B2
(45) Date of Patent: Nov. 30, 2021

(54) DEVICES AND METHODS FOR DETECTING ELEMENTS IN A SAMPLE

(71) Applicant: THERMO SCIENTIFIC PORTABLE ANALYTICAL INSTRUMENTS INC., Carlsbad, CA (US)

(72) Inventors: Pietro Caria, Munich (DE); Michael E. Dugas, Londonderry, NH (US); Gregory M. Tully, Tewksbury, MA (US); Stephen I. Shefsky, Brooklyn, NY (US)

(73) Assignee: Thermo Scientific Portable Analytical Instruments Inc., Tewksbury, MA (US)

( * ) Notice: Subject to any disclaimer, the term of this patent is extended or adjusted under 35 U.S.C. 154(b) by 0 days.

(21) Appl. No.: 16/946,801

(22) Filed: Jul. 7, 2020

(65) Prior Publication Data
US 2021/0010957 A1 Jan. 14, 2021

Related U.S. Application Data

(60) Provisional application No. 62/871,570, filed on Jul. 8, 2019.

(51) Int. Cl.
*G01N 23/223* (2006.01)

(52) U.S. Cl.
CPC ..... *G01N 23/223* (2013.01); *G01N 2223/076* (2013.01)

(58) Field of Classification Search
CPC .................. G01N 2223/076; G01N 23/223
See application file for complete search history.

(56) References Cited

U.S. PATENT DOCUMENTS

| | | | |
|---|---|---|---|
| 3,925,660 A | 12/1975 | Albert | |
| 4,429,409 A | 1/1984 | Berry et al. | |
| 6,614,524 B1 * | 9/2003 | Kuwabara | G01N 23/223 250/339.09 |
| 7,649,975 B2 | 1/2010 | Boyden et al. | |
| 2010/0310041 A1 | 12/2010 | Adams et al. | |
| 2013/0321793 A1 * | 12/2013 | Hamilton | G01N 23/223 356/72 |
| 2019/0227009 A1 * | 7/2019 | Furukawa | G01N 23/223 |

* cited by examiner

*Primary Examiner* — Chih-Cheng Kao

(57) ABSTRACT

Devices and methods are disclosed for identifying compounds using spectra generated by X-rays at two different voltage levels.

13 Claims, 22 Drawing Sheets

| SAMPLE | d g/cm^3 | u cm^2/g - 16.61keV | u cm^2/g - 17.44keV | u cm^2/g - 22.1keV | u cm^2/g - 34keV |
|---|---|---|---|---|---|
| Na2CO3 | 2.54 | 2.216 | 1.934 | 1.031 | 0.404 |
| CaCO3 | 2.71 | 9.659 | 8.408 | 4.296 | 1.326 |
| KHCO3 | 2.17 | 8.039 | 6.996 | 3.577 | 1.119 |
| NH4Cl | 1.53 | 9.057 | 1.011 | 4.002 | 1.234 |
| NaBr | 3.21 | 67.51 | 59.42 | 31.65 | 9.753 |
| NaI | 3.67 | 35.98 | 31.55 | 16.67 | 28.54 |
| NaCl | 2.17 | 9.425 | 8.181 | 4.132 | 1.256 |
| CaCl2 2H2O | 1.85 | 12.78 | 11.11 | 5.626 | 1.668 |
| NH4Br | 2.43 | 70.25 | 61.85 | 32.97 | 10.17 |
| KBr | 2.75 | 63.83 | 56.12 | 29.76 | 9.116 |
| KCl | 1.98 | 16.1 | 13.99 | 7.054 | 2.076 |
| KI | 3.12 | 36.4 | 31.89 | 16.77 | 26.26 |
| Al2O3 | 3.95 | 3.7 | 3.284 | 1.693 | 0.1005 |
| MgO | 3.58 | 3.397 | 2.954 | 1.53 | 0.541 |
| SiO2 | 2.65 | 4.324 | 3.758 | 1.931 | 0.6523 |
| K2Cr2O7 | 2.68 | 17.82 | 15.36 | 7.872 | 2.351 |

FIG. 3A

| | Coh/Com | u cm^2/g - 16.61 keV |
|---:|---:|---:|
| naco3 | 0.436946471 | 2.216 |
| caco3 | 0.772391225 | 9.659 |
| khco3 | 0.680576864 | 8.039 |
| nh4cl | 0.635434034 | 9.057 |
| nacl | 0.763094922 | 9.425 |
| cacl2 | 0.849066128 | 12.78 |
| kcl | 1.042760181 | 16.1 |
| al2o3 | 0.528513938 | 3.7 |
| mgo | 0.453810173 | 3.397 |
| sio2 | 0.520748492 | 4.324 |

FIG. 3C

*Fitting Model*

$$Y = \bar{b} + \bar{a}x + \varepsilon$$

▲ $x$ – spectra from the evaluation set
▲ $y$ – spectra from the training set $$a = \frac{N \sum x_i y_i - \sum x_i \sum y_i}{N \sum x_i^2 - (\sum x_i)^2} \quad \text{Least squared estimator slope}$$

$$b = \frac{N \sum x_i^2 \sum y_i - \sum x_j \sum x_j y_j}{N \sum x_i^2 - (\sum x_i)^2} \quad \text{Least squared estimator offset}$$

$\delta_a, \delta_b$  Error of the least-squared estimators  $\delta_a = \delta_y \sqrt{\dfrac{N}{N \sum x_i^2 - (\sum x_i)^2}} \quad \delta_b = \delta_y \sqrt{\dfrac{\sum x_j^2}{N \sum x_i^2 - (\sum x_t)^2}}$ $t = \dfrac{a - a_0}{\delta_a}$  The null hypothesis test is that the slope $a$ is equal to a specified value $a_0$. Since the null hypothesis is that $x$ and $y$ are independent, $a_0$ is 0.

FIG. 4A t score can be written in terms of residuals as follow:

$$\hat{\varepsilon}_i = y_i - \hat{y}_i = y_i - (a + bx_i)$$

$$t = \frac{\sqrt{n-2}(a-a_0)}{\sqrt{\frac{SSR}{\sum(x_i-\bar{x})^2}}} \qquad \delta_y \sqrt{\frac{\sum(y_i - b - ax_i)^2}{N-2}} \qquad \delta_y \sqrt{\frac{SSR}{N-2}} \qquad SSR = \text{sum of squared of residuals}$$

*t* increases if SSR decreases. SSR decreases whether the spectrum from the evaluation set accurately matches the spectrum from the training set.

Matching Criteria D

$$D = \frac{t_i - \min(\bar{t})}{\min(\bar{t}) - \max(\bar{t})}$$

*t* is rescaled within the interval [0,1] : D of the best matching will be 1

$$0 \leq D \leq 1$$

FIG. 4B

| El | from | to | El | from | to |
|---|---|---|---|---|---|
| Mg | 1.15 | 1.35 | As | 10.4 | 10.7 |
| Al | 1.4 | 1.6 | Se | 11.01 | 11.29 |
| Si | 1.65 | 1.85 | Br | 11.72 | 12.12 |
| P | 1.82 | 2.2 | Zr | 15.53 | 15.98 |
| S | 2.17 | 2.4 | Nb | 16.38 | 16.83 |
| Cl | 2.25 | 2.75 | Mo | 17.23 | 17.68 |
| Ar | 2.86 | 3.06 | Ru | 19.08 | 19.4 |
| K | 3.2 | 3.4 | Rh | 20.01 | 20.41 |
| Ca | 3.6 | 3.8 | Pd | 20.6 | 21.6 |
| Sc | 3.9 | 4.1 | Ag | 21.8 | 22.38 |
| Ti | 4.31 | 4.71 | Cd | 22.9 | 23.5 |
| V | 4.75 | 5.15 | In | 23.71 | 24.71 |
| Cr | 5.21 | 5.61 | Sn | 24.85 | 25.45 |
| Mn | 5.7 | 6.1 | Sb | 26 | 26.8 |
| Fe | 6.2 | 6.6 | Te | 27.07 | 27.87 |
| Co | 6.73 | 7.13 | I | 28.21 | 29.01 |
| Ni | 7.35 | 7.67 | Ba | 31.7 | 32.7 |
| Cu | 7.84 | 8.24 | Bk1 | 16.2 | 16.9 |
| Zn | 8.47 | 8.83 | Bk2 | 34.01 | 26 |
| Ga | 9.05 | 9.45 | Bk3 | 17.9 | 18.77 |
| Ge | 9.69 | 10.09 | Bk4 | 19.35 | 20.14 |

FIG. 5

| 30sec | na2co3 | caco3 | khco3 | nh4cl | nabr | nai | nacl | cacl2_2h2o | nh4br | kbr | kcl | ki | al2o3 | mgo | sio2 | k2cr2o7 | Evaluation set |
|---|---|---|---|---|---|---|---|---|---|---|---|---|---|---|---|---|---|
| na2co3 | 0.9989048 | 0.1301935 | 0.6308395 | 0.7299594 | 0.0089060 | 0.0110219 | 0.7906941 | 0.6419209 | 0.0080112 | 0.0088481 | 0.4940952 | 0.0112634 | 0.9736681 | 0.9956982 | 0.9925568 | 0.0002821 | |
| caco3 | 0.1327857 | 0.9999147 | 0.1022469 | 0.1020770 | 0.0057035 | 0.0013131 | 0.1291812 | 0.4536924 | 0.0057070 | 0.0056523 | 0.0885482 | 0.0012471 | 0.1409054 | 0.1286017 | 0.1383021 | 0.0006537 | |
| khco3 | 0.5097561 | 0.9990431 | 0.9999657 | 0.4234696 | 0.0102059 | 0.0087492 | 0.5200756 | 0.4239268 | 0.0102098 | 0.0096688 | 0.7227167 | 0.0105292 | 0.5475298 | 0.4900501 | 0.5533165 | 0.0075633 | |
| nh4cl | 0.7314786 | 0.0999383 | 0.4286549 | 0.9999366 | 0.0103421 | 0.0129558 | 0.9131667 | 0.8256633 | 0.0102542 | 0.0100040 | 0.7824285 | 0.0132943 | 0.7718385 | 0.7076860 | 0.7590987 | 0.0080037 | |
| nabr | 0.0089854 | 0.0056569 | 0.0101398 | 0.0099080 | 1.0000000 | 0.0012620 | 0.0086349 | 0.0137533 | 1.0000000 | 0.9999961 | 0.0084724 | 0.0012508 | 0.0102339 | 0.0082263 | 0.0095005 | 0.0024004 | |
| nai | 0.0118596 | 0.0012439 | 0.0084290 | 0.0129160 | 0.0012680 | 0.9999977 | 0.0231552 | 0.0111758 | 0.0012659 | 0.0012662 | 0.0095385 | 0.9999651 | 0.0194869 | 0.0076475 | 0.0152974 | 0.0006439 | |
| nacl | 0.7850432 | 0.1260124 | 0.5226374 | 0.9126470 | 0.0089249 | 0.0229623 | 0.9997442 | 0.8287269 | 0.0089348 | 0.0088743 | 0.7559961 | 0.0234590 | 0.8798627 | 0.7440164 | 0.8398465 | 0.0001747 | |
| cacl2_2h2o | 0.6397823 | 0.4460223 | 0.4238944 | 0.8279037 | 0.0137609 | 0.0144825 | 0.8271712 | 0.9995333 | 0.0013757 | 0.0136891 | 0.6902099 | 0.0116571 | 0.6989436 | 0.6147221 | 0.6773776 | 0.0000840 | |
| nh4br | 0.0089940 | 0.0066562 | 0.0101440 | 0.0099133 | 1.0000000 | 0.0012632 | 0.0087000 | 0.0137575 | 1.0000000 | 0.9999960 | 0.0094733 | 0.0012521 | 0.0102421 | 0.0082351 | 0.0095089 | 0.0023985 | |
| kbr | 0.0089276 | 0.0056828 | 0.0096101 | 0.0098520 | 0.9999967 | 0.0012648 | 0.0086272 | 0.0136576 | 0.9999867 | 0.9999999 | 0.0003973 | 0.0012505 | 0.0101659 | 0.0081719 | 0.0094357 | 0.0023605 | |
| kcl | 0.4980994 | 0.0082095 | 0.7304238 | 0.7831799 | 0.0007816 | 0.0087665 | 0.7571445 | 0.6912473 | 0.0007852 | 0.0006878 | 0.9996977 | 0.0100234 | 0.5645671 | 0.4741986 | 0.5391195 | 0.0016229 | |
| ki | 0.0121144 | 0.0011815 | 0.0101773 | 0.0132610 | 0.0012503 | 0.9995582 | 0.0236534 | 0.0113641 | 0.0012482 | 0.0012473 | 0.0108703 | 0.9999979 | 0.0108662 | 0.0078328 | 0.0156136 | 0.0005332 | |
| al2o3 | 0.9743676 | 0.9499785 | 0.5499785 | 0.7718165 | 0.0101442 | 0.0100186 | 0.8846804 | 0.7018460 | 0.0101583 | 0.0100010 | 0.5613070 | 0.0193991 | 0.9999422 | 0.9520596 | 0.9932247 | 0.0003421 | |
| mgo | 0.9956773 | 0.1266335 | 0.4907365 | 0.7075784 | 0.0082355 | 0.0073577 | 0.7531123 | 0.6181694 | 0.0082409 | 0.0081801 | 0.4711499 | 0.0075401 | 0.9531273 | 0.9999464 | 0.9803914 | 0.0002754 | |
| sio2 | 0.9920096 | 0.1351034 | 0.5356922 | 0.7587029 | 0.0096042 | 0.0145707 | 0.8479393 | 0.6808196 | 0.0096101 | 0.0095426 | 0.5367865 | 0.0148770 | 0.9937502 | 0.9784612 | 0.9999365 | 0.0003580 | |
| k2cr2o7 | 0.0002498 | 0.0006345 | 0.0075187 | 0.0000835 | 0.0023888 | 0.0096896 | 0.0002071 | 0.0008575 | 0.0023848 | 0.0023539 | 0.0016509 | 0.0005765 | 0.0000020 | 0.0008212 | 0.0003133 | 0.9999966 | |
| Training Set | | | | | | | | | | | | | | | | | |

FIG. 6

| 30sec | na2co3 | caco3 | khco3 | nh4cl | nabr | nai | nacl | cacl2 2h2o | nh4br | kbr | kcl | ki | al2o3 | mgo | sio2 | k2cr2o7 | Evaluation set |
|---|---|---|---|---|---|---|---|---|---|---|---|---|---|---|---|---|---|
| na2co3 | 1.0018112 | 0.5501609 | 1.5870560 | 2.4670633 | -0.0025946 | 0.0130501 | 2.7993414 | 3.1707360 | -0.0025818 | -0.0036321 | 3.1344366 | 0.0147778 | 1.5207874 | 1.7456803 | 1.6673973 | 0.0132594 | |
| caco3 | 0.2389286 | 0.9979197 | 0.4651827 | 0.6038285 | -0.0013538 | 0.0029482 | 0.7405765 | 1.7446918 | -0.0013523 | -0.0019000 | 0.8684656 | 0.0032185 | 0.3786565 | 0.4196649 | 0.4073750 | -0.0132100 | |
| khco3 | 0.3217435 | 0.2158387 | 0.9936988 | 0.8472023 | -0.0012445 | 0.0062299 | 1.0211906 | 1.1590088 | -0.0012430 | -0.0017078 | 1.7051405 | 0.0064268 | 0.5123663 | 0.5512563 | 0.5497634 | 0.0308794 | |
| nh4cl | 0.2973301 | 0.1672602 | 0.5049646 | 1.0019410 | -0.0009524 | 0.0049096 | 1.0438982 | 1.2478210 | -0.0009516 | -0.0013401 | 1.3660991 | 0.0055711 | 0.4698484 | 0.5108136 | 0.5059901 | -0.0005276 | |
| nabr | -3.4766746 | -4.1982787 | -8.1933250 | -10.5223854 | 1.0026469 | -0.1616593 | -10.7466219 | -16.9906736 | 1.0012349 | 1.4135671 | -3.5481731 | -0.1802875 | -5.7078292 | -5.8094788 | -5.9723431 | -1.4158617 | |
| nai | 0.8782430 | 0.4328739 | 1.6426158 | 2.6416027 | -0.0078584 | 1.0005808 | 3.8560992 | 3.3676774 | -0.0078328 | -0.0110686 | 3.5093076 | 1.1206075 | 1.6668165 | 1.2316246 | 1.6662603 | -0.1612407 | |
| nacl | 0.2803618 | 0.1709493 | 0.5075062 | 0.8712803 | -0.0008172 | 0.0059492 | 0.9941722 | 1.1378047 | -0.0008165 | -0.0011488 | 1.2245584 | 0.0067359 | 0.4566002 | 0.4760531 | 0.4844254 | 0.0032955 | |
| cacl2 2h2o | 0.2019290 | 0.2563958 | 0.3846536 | 0.6620594 | -0.0008096 | 0.0833564 | 0.7214819 | 0.9999975 | -0.0008009 | -0.0011394 | 0.9335141 | 0.0037883 | 0.3248635 | 0.3456696 | 0.3470987 | -0.0018236 | |
| nh4br | -3.4808845 | -4.2108661 | -8.2204300 | -10.5573518 | 1.0057153 | -0.1622325 | -10.7826519 | -17.0453004 | 1.0042990 | 1.4178930 | -3.5623325 | -0.1809287 | -5.7275942 | -5.8303401 | -5.9929610 | -1.4196268 | |
| kbr | -2.4438577 | -2.3464614 | -5.6252403 | -7.3993818 | 0.7070662 | -0.1141286 | -7.5489834 | -11.9401200 | 0.7060705 | 0.9968605 | -2.2945449 | -0.1271235 | -4.0117808 | -4.0832810 | -4.1973340 | -0.9901402 | |
| kcl | 0.1592433 | 0.1019881 | 0.4278186 | 0.5755173 | -0.0001724 | 0.0026212 | 0.6169325 | 0.7410247 | -0.0001726 | -0.0002281 | 1.0041190 | 0.0031396 | 0.2602859 | 0.2713454 | 0.2767583 | 0.0076619 | |
| ki | 0.7912893 | 0.3760803 | 1.6090488 | 2.3861365 | -0.0069493 | 0.8917946 | 3.4743616 | 3.0273581 | -0.0069337 | -0.0097836 | 3.3362026 | 0.9891995 | 1.5190847 | 1.1111699 | 1.5006866 | -0.1308001 | |
| al2o3 | 0.6406127 | 0.3861221 | 1.0677655 | 1.6432949 | -0.0017869 | 0.0111045 | 1.9101049 | 2.1476712 | -0.0017849 | -0.0025114 | 2.1645084 | 0.0126530 | 0.9983390 | 1.1056731 | 1.0804754 | 0.0094581 | |
| mgo | 0.5728261 | 0.3109040 | 0.8921885 | 1.3917946 | -0.0014242 | 0.0081096 | 1.5654471 | 1.7829124 | -0.0014226 | -0.0020091 | 1.7538428 | 0.0068282 | 0.8621750 | 1.0025151 | 0.9495536 | 0.0075070 | |
| sio2 | 0.5996826 | 0.3368101 | 0.9776651 | 1.5115543 | -0.0016130 | 0.0090174 | 1.7421717 | 1.9624216 | -0.0016113 | -0.0022668 | 1.9633593 | 0.0102068 | 0.9233336 | 1.0400984 | 1.0057334 | 0.0089763 | |
| k2cr2o7 | 0.0200475 | -0.0486230 | 0.2439819 | -0.0069663 | -0.0016947 | -0.0041296 | 0.0573608 | -0.0379833 | -0.0016908 | -0.0023716 | 0.2293767 | -0.0042325 | 0.0339076 | 0.0329459 | 0.0573055 | 0.9993554 | |
| Training Set | | | | | | | | | | | | | | | | | |

FIG. 7

| 30sec | na2co3 | caco3 | khco3 | nh4cl | nabr | nai | nacl | cacl2 2h2o | nh4br | kbr | kcl | ki | al2o3 | mgo | sio2 | k2cr2o7 | Evaluation set |
|---|---|---|---|---|---|---|---|---|---|---|---|---|---|---|---|---|---|
| na2co3 | 648.2471883 | 2.4468837 | 6.4502655 | 10.3985599 | -0.5985339 | 0.6676759 | 12.2925948 | 8.4680084 | -0.5997098 | -0.5975632 | 6.2503009 | 0.6753307 | 38.4586387 | 96.2208973 | 73.0343172 | 0.1062485 | |
| caco3 | 2.4745985 | 694.7378402 | 2.134278 | 2.1324286 | -0.4790080 | 0.2293326 | 2.4359357 | 5.7635776 | -0.4791555 | -0.4768415 | 1.9713012 | 0.2234902 | 2.5613756 | 2.4296569 | 2.5337676 | -0.1617573 | |
| khco3 | 6.4491889 | 2.0968602 | 554.0167684 | 5.4426164 | -0.6422185 | 0.5941850 | 6.5838023 | 5.4254698 | -0.6423427 | -0.6249217 | 10.2106211 | 0.6524199 | 6.9572703 | 6.2073731 | 6.7610051 | 0.5521192 | |
| nh4cl | 10.4385792 | 2.1074628 | 5.4781592 | 654.3770803 | -0.6309922 | 0.7245930 | 20.5098199 | 13.7637603 | -0.6373805 | -0.6357699 | 11.9936475 | 0.7341242 | 11.6324710 | 9.8457333 | 11.2260923 | -0.0121820 | |
| nabr | -0.6022260 | -0.4770348 | -0.6400878 | -0.6328801 | 31872.1002313 | 0.2248190 | -0.5923231 | -0.7468622 | 28868.7772158 | 694.0271081 | -0.1374976 | -0.2238224 | -0.6431976 | -0.5760063 | -0.6194074 | -0.3102356 | |
| nai | 0.6928777 | 0.2232801 | 0.5831178 | 0.7234646 | -0.2253346 | 4183.8886697 | 0.9737367 | 0.6723716 | -0.7251655 | -0.2253699 | 0.6213132 | 303.2157471 | 0.8679086 | 0.5552102 | 0.7982911 | -0.1605385 | |
| nacl | 12.0865175 | 2.4915077 | 6.6176840 | 20.4429022 | -0.6601742 | 0.9695766 | 395.3845677 | 13.9120480 | -0.6005124 | -0.5984553 | 11.1324654 | 0.9802653 | 17.1158508 | 10.7823932 | 14.4831048 | 0.0836043 | |
| cacl2 2h2o | 8.4287575 | 5.5749515 | 5.4251803 | 13.8716424 | -0.7470717 | 0.6816413 | 13.8362876 | 292.6882625 | -0.7474797 | -0.7450930 | 9.4403215 | 0.8986661 | 9.6366724 | 7.9888150 | 9.1642761 | -0.0579832 | |
| nh4br | -0.6025170 | -0.4770051 | -0.6402476 | -0.6328528248 | 28002.8003263 | -0.2249279 | -0.5924973 | -0.7469791 | 32284.6168830 | 169.4458276 | -0.1376252 | -0.2239334 | -0.6433683 | -0.5763136 | -0.6196832 | -0.3101112 | |
| kbr | -0.6002660 | -0.4747367 | -0.6230028 | -0.6308724 | 1733.9251037 | -0.2250674 | -0.5899910 | -0.7442221 | 1734.2953833 | 17752.6604957 | -0.1260828 | -0.2237942 | -0.6409452 | -0.5740801 | -0.6173025 | -0.3076407 | |
| kcl | 6.3005597 | 1.9671622 | 10.4106219 | 12.0201814 | -0.1768858 | 0.5947790 | 11.1672290 | 9.4632719 | -0.1772909 | -0.1659244 | 363.6982638 | 0.6363825 | 7.2015692 | 6.0061946 | 6.8403507 | 0.2549903 | |
| ki | 0.7003715 | 0.2175181 | 0.6413101 | 0.7331895 | -0.2237736 | 300.8201182 | 0.9844064 | 0.6780775 | -0.2235833 | -0.2235011 | 0.6630170 | 4324.7615719 | 0.8770167 | 0.5619471 | 0.7965239 | -0.1460777 | |
| al2o3 | 38.9938972 | 2.5242371 | 6.9817546 | 11.6317464 | -0.6402539 | 0.8806206 | 17.5174788 | 9.7035488 | -0.6404492 | -0.6382360 | 7.1568209 | 0.8895584 | 831.6355274 | 28.1846314 | 76.6322118 | 0.1170002 | |
| mgo | 95.9864963 | 2.4082747 | 6.2084462 | 9.8361300 | -0.5763294 | 0.5445072 | 11.0461286 | 8.0472665 | -0.5765193 | -0.5743721 | 5.9895729 | 0.5512683 | 28.5197241 | 864.1848738 | 44.7204633 | 0.1049796 | |
| sio2 | 70.4697676 | 2.4996602 | 6.7933601 | 11.2147542 | -0.6228097 | 0.7690358 | 14.9349521 | 9.2369358 | -0.6230035 | -0.6207896 | 6.8079123 | 0.7772173 | 79.7509414 | 42.6276251 | 494.6526235 | 0.1196869 | |
| k2cr2o7 | 0.0998791 | -0.1593620 | 0.5394767 | -0.0118793 | -0.3094851 | -0.1660259 | 0.0910351 | -0.0479497 | -0.3092229 | -0.3072009 | 0.2571980 | -0.1518946 | 0.1099260 | 0.0940813 | 0.1119701 | 1725.7741419 | |
| Training Set | | | | | | | | | | | | | | | | | |

FIG. 8

| 30sec | na2co3 | caco3 | khco3 | nh4cl | nabr | nai | nacl | cacl2 2h2o | nh4br | kbr | kcl | ki | al2o3 | mgo | sio2 | k2cr2o7 |
|---|---|---|---|---|---|---|---|---|---|---|---|---|---|---|---|---|
| na2co3 | 1.0000000 | 0.0042672 | 0.0127636 | 0.0168413 | 0.0000046 | 0.0002134 | 0.0325400 | 0.0314038 | 0.0000038 | 0.0000053 | 0.0175572 | 0.0002079 | 0.0468819 | 0.1119353 | 0.1487142 | 0.0002413 |
| caco3 | 0.0047424 | 1.0000000 | 0.0050025 | 0.0042217 | 0.0000084 | 0.0001086 | 0.0076480 | 0.0221874 | 0.0000068 | 0.0000097 | 0.0057964 | 0.0001035 | 0.0036506 | 0.0034761 | 0.0063671 | 0.0000860 |
| khco3 | 0.0108680 | 0.0037565 | 1.0000000 | 0.0032754 | 0.0000033 | 0.0001958 | 0.0181230 | 0.0210351 | 0.0000027 | 0.0000043 | 0.0284421 | 0.0002026 | 0.0091323 | 0.0079446 | 0.0149023 | 0.0004996 |
| nh4cl | 0.0170164 | 0.0037718 | 0.0110310 | 1.0000000 | 0.0000035 | 0.0002270 | 0.0532918 | 0.0494512 | 0.0000028 | 0.0000039 | 0.0333427 | 0.0002215 | 0.0147497 | 0.0120519 | 0.0239193 | 0.0001727 |
| nabr | 0.0000004 | 0.0000000 | 0.0000003 | 0.0000003 | 1.0000000 | 0.0000001 | 0.0000004 | 0.0000084 | 0.7295217 | 0.0610654 | 0.0000004 | 0.0000000 | 0.0000003 | 0.0000004 | 0.0000006 | 0.0000000 |
| nai | 0.0019964 | 0.0010219 | 0.0022356 | 0.0020707 | 0.0000164 | 1.0000000 | 0.0039554 | 0.0048370 | 0.0000133 | 0.0000187 | 0.0020859 | 0.0701597 | 0.0018159 | 0.0013085 | 0.0000000 | 0.0000867 |
| nacl | 0.0195562 | 0.0042009 | 0.0130854 | 0.0321762 | 0.0000046 | 0.0002855 | 1.0000000 | 0.0499666 | 0.0000037 | 0.0000053 | 0.0309758 | 0.0002704 | 0.0213381 | 0.0131351 | 0.0304939 | 0.0000282 |
| cacl2 2h2o | 0.0139189 | 0.0039782 | 0.0109353 | 0.0221442 | 0.0000080 | 0.0002167 | 0.0364384 | 1.0000000 | 0.0000000 | 0.0000000 | 0.0263249 | 0.0002106 | 0.0123517 | 0.0099046 | 0.0197547 | 0.0001461 |
| nh4br | 0.0000000 | 0.0000000 | 0.0000000 | 0.0000000 | 0.9099704 | 0.0000000 | 0.0000000 | 0.0000000 | 1.0000000 | 0.0000363 | 0.0000000 | 0.0000000 | 0.0000000 | 0.0000000 | 0.0000000 | 0.0000001 |
| kbr | 0.0000035 | 0.0000034 | 0.0000311 | 0.0000030 | 0.0544248 | 0.0000000 | 0.0000063 | 0.0000094 | 0.0441648 | 1.0000000 | 0.0000317 | 0.0000000 | 0.0000029 | 0.0000026 | 0.0000048 | 0.0000015 |
| kcl | 0.0106389 | 0.0035671 | 0.0199238 | 0.0193173 | 0.0000179 | 0.0001959 | 0.0296980 | 0.0347956 | 0.0000145 | 0.0000209 | 1.0000000 | 0.0001989 | 0.0094259 | 0.0076119 | 0.0150625 | 0.0003275 |
| ki | 0.0020080 | 0.0010136 | 0.0023105 | 0.0020855 | 0.0000164 | 0.0719496 | 0.0039823 | 0.0048565 | 0.0000133 | 0.0000188 | 0.0022086 | 1.0000000 | 0.0010268 | 0.0013163 | 0.0028595 | 0.0000951 |
| al2o3 | 0.0610256 | 0.0043800 | 0.0137599 | 0.0187243 | 0.0000034 | 0.0002643 | 0.0457349 | 0.0358144 | 0.0000027 | 0.0000039 | 0.0200490 | 0.0002575 | 1.0000000 | 0.0332588 | 0.1559786 | 0.0002475 |
| mgo | 0.1488619 | 0.0042108 | 0.0123476 | 0.0159860 | 0.0000054 | 0.0001839 | 0.0293922 | 0.0299700 | 0.0000044 | 0.0000062 | 0.0167856 | 0.0001792 | 0.0358400 | 1.0000000 | 0.0915459 | 0.0002406 |
| sio2 | 0.1095358 | 0.0043442 | 0.0134022 | 0.0180877 | 0.0000039 | 0.0002376 | 0.0392130 | 0.0340243 | 0.0000032 | 0.0000045 | 0.0190898 | 0.0002315 | 0.0963954 | 0.0499605 | 1.0000000 | 0.0002491 |
| k2cr2o7 | 0.0010827 | 0.0004636 | 0.0021468 | 0.0009480 | 0.0000137 | 0.0000141 | 0.0017262 | 0.0023822 | 0.0000112 | 0.0000158 | 0.0010851 | 0.0000167 | 0.0009051 | 0.0007752 | 0.0014773 | 1.0000000 |

FIG. 9

|  | 30sec | | 20sec | | 10sec | |
|---|---|---|---|---|---|---|
| 30sec | nabr | nh4br | nabr | nh4br | nabr | nh4br |
| na2co3 | -0.5995339 | -0.5997098 | -0.5993400 | -0.5998033 | -0.5996670 | -0.5998704 |
| caco3 | -0.4790060 | -0.4791555 | -0.4790764 | -0.4794513 | -0.4793120 | -0.4752029 |
| khco3 | -0.6422385 | -0.6423427 | -0.6419156 | -0.6424791 | -0.6425918 | -0.6423628 |
| nh4cl | -0.6369922 | -0.6373805 | -0.6369996 | -0.6374536 | -0.6374425 | -0.6374880 |
| nabr | 31872.1002313 | 28658.7772156 | 28867.6971111 | 23659.8097497 | 19928.0140152 | 22619.8187896 |
| nai | -0.2253546 | -0.2251655 | -0.2252519 | -0.2249501 | -0.2250173 | -0.2252604 |
| nacl | -0.6001742 | -0.6005124 | -0.6000984 | -0.6005360 | -0.6004933 | -0.6006022 |
| cacl2 2h2o | -0.7470717 | -0.7474797 | -0.7471234 | -0.7476735 | -0.7475948 | -0.7475941 |
| nh4br | 29002.6003203 | 39284.6168306 | 24525.1214416 | 25686.5918234 | 16742.1657756 | 23463.6318049 |
| kbr | 1733.9251037 | 1734.2833033 | 1752.3646411 | 1717.6246099 | 1694.2002746 | 1737.1220377 |
| kcl | -0.1768858 | -0.1772909 | -0.1768410 | -0.1774418 | -0.1775350 | -0.1773463 |
| ki | -0.2237736 | -0.2235833 | -0.2236635 | -0.2233786 | -0.2234321 | -0.2236794 |
| al2o3 | -0.6402539 | -0.6404492 | -0.6400592 | -0.6405030 | -0.5765019 | -0.6405804 |
| mgo | -0.5763294 | -0.5765193 | -0.5761412 | -0.5768401 | -0.5765019 | -0.5767012 |
| sio2 | -0.6228097 | -0.6230035 | -0.6226202 | -0.6230771 | -0.6229520 | -0.6231620 |
| k2cr2o7 | -0.3091851 | -0.3092229 | -0.3098373 | -0.3099587 | -0.3095254 | -0.3097332 |

FIG. 12A $$t = \frac{\sqrt{n-2}(a-a_0)}{\sqrt{\frac{SSR}{\sum(x_i - \bar{x})^2}}}$$

| 30sec | 30sec nabr | 30sec nh4br | 20sec nabr | 20sec nh4br | 10sec nabr | 10sec nh4br |
|---|---|---|---|---|---|---|
| na2co3 | 0.00000463 | 0.00000376 | 0.00000512 | 0.00000576 | 0.00000742 | 0.00000630 |
| caco3 | 0.00000641 | 0.00000683 | 0.00000929 | 0.00001044 | 0.00001346 | 0.00001144 |
| khco3 | 0.00000329 | 0.00000268 | 0.00000364 | 0.00000410 | 0.00000527 | 0.00000448 |
| nh4cl | 0.00000145 | 0.00000280 | 0.00000541 | 0.00000429 | 0.00000553 | 0.00000469 |
| nabr | 1.00000000 | 0.72352167 | 1.00000000 | 0.92109802 | 1.00000000 | 0.96403855 |
| nai | 0.00003637 | 0.00001330 | 0.00000806 | 0.00002035 | 0.00002622 | 0.00002226 |
| nacl | 0.00000461 | 0.00000374 | 0.00000509 | 0.00000573 | 0.00000738 | 0.00000626 |
| cacl2·2h2o | 0.00000000 | 0.00000000 | 0.00000000 | 0.00000000 | 0.00000000 | 0.00000000 |
| nh4br | 0.90997039 | 1.00000000 | 0.84957362 | 1.00000000 | 0.84014319 | 1.00000000 |
| kbr | 0.05442476 | 0.04416481 | 0.06072761 | 0.06689569 | 0.08905034 | 0.07406416 |
| kcl | 0.00001789 | 0.00001451 | 0.00001975 | 0.00002220 | 0.00001860 | 0.00002430 |
| ki | 0.00003642 | 0.00001334 | 0.00001813 | 0.00002041 | 0.00002630 | 0.00002233 |
| al2o3 | 0.00000335 | 0.00000272 | 0.00000371 | 0.00000417 | 0.00000538 | 0.00000456 |
| mgo | 0.00000536 | 0.00000435 | 0.00000592 | 0.00000666 | 0.00000859 | 0.00000728 |
| sio2 | 0.00000390 | 0.00000317 | 0.00000431 | 0.00000485 | 0.00000625 | 0.00000530 |
| k2cr2o7 | 0.00001373 | 0.00001116 | 0.00001515 | 0.00001704 | 0.00002198 | 0.00001866 |

FIG. 12B $$D = \frac{t_i - \min(t)}{\min(t) - \max(t)}$$

| 50sec | nabr | nabr | nabr | nabr | nabr | nabr | nabr | nabr | nabr | nabr | nabr | nabr | nabr | Evaluation set |
|---|---|---|---|---|---|---|---|---|---|---|---|---|---|---|
| na2co3 | -0.5986166 | -0.5988377 | -0.5985719 | -0.5987234 | -0.5985060 | -0.5988646 | -0.5987910 | -0.5989479 | -0.5988068 | -0.5987090 | -0.5991278 | -0.5987518 | -0.5988626 | -0.5989256 | -0.5988103 |
| caco3 | -0.4789586 | -0.4788729 | -0.4789580 | -0.4789393 | -0.4790002 | -0.4790880 | -0.4788943 | -0.4790878 | -0.4789063 | -0.4791088 | -0.4790947 | -0.4788814 | -0.4790422 | -0.4791199 | -0.4789361 |
| khco3 | -0.6418842 | -0.6419611 | -0.6418059 | -0.6418750 | -0.6420366 | -0.6419441 | -0.6419800 | -0.6420967 | -0.6419051 | -0.6419341 | -0.6423010 | -0.6419356 | -0.6420331 | -0.6420073 | -0.6419946 |
| nh4cl | -0.6367244 | -0.6367939 | -0.6366221 | -0.6366157 | -0.6369827 | -0.6368819 | -0.6368629 | -0.6371115 | -0.6368465 | -0.6368798 | -0.6370666 | -0.6368298 | -0.6368248 | -0.6369053 | -0.6368747 |
| nabr | 36390.6325803 | 38821.2644358 | 32460.3174324 | 43175.6128429 | 31911.5586076 | 47142.8504753 | 37822.7508641 | 39738.6103231 | 38171.8753974 | 47194.6408066 | 32926.4768867 | 44655.5883426 | 31278.3833667 | 52160.3832386 | 44979.1643626 43980.7352051 |
| nai | -0.2250102 | -0.2250859 | -0.2250238 | -0.2249249 | -0.2251315 | -0.2250931 | -0.2249108 | -0.2250203 | -0.2251694 | -0.2250350 | -0.2251223 | -0.2250246 | -0.2250292 | -0.2251130 | -0.2251618 |
| nacl | -0.6000285 | -0.6001135 | -0.5998191 | -0.6000920 | -0.6003972 | -0.6001466 | -0.6001448 | -0.6004301 | -0.6001182 | -0.6001770 | -0.6003737 | -0.6000762 | -0.6002189 | -0.6001431 | -0.6001148 |
| cacl2.2h2o | -0.7469626 | -0.7470168 | -0.7468329 | -0.7470285 | -0.7473367 | -0.7471271 | -0.7470397 | -0.7473185 | -0.7470122 | -0.7471607 | -0.7472573 | -0.7470433 | -0.7471412 | -0.7471462 | -0.7470471 |
| nh4br | 17184.3758805 | 19283.3932642 | 16794.2227451 | 19390.3680952 | 18888.6349623 | 19761.6661333 | 18689.1606138 | 18883.2497546 | 17735.7938358 | 17953.4572639 | 20815.4177174 | 18442.7470632 | 19199.1793362 | 19211.0800262 | 18849.9200868 |
| kbr | 1727.61703591 | 1732.98990111 | 1724.24609556 | 1733.5071309 | 1720.6025217 | 1734.04584408 | 1727.74616961 | 1731.19466011 | 1734.89597041 | 1720.93995053 | 1715.55934541 | 1727.75179091 | 1726.55199921 | 1730.26020861 | 1723.78064351 |
| kcl | -0.1769162 | -0.1769316 | -0.1767858 | -0.1769622 | -0.1770319 | -0.1769841 | -0.1770272 | -0.1772135 | -0.1769408 | -0.1771003 | -0.1772123 | -0.1769944 | -0.1770612 | -0.1770216 | -0.1770236 |
| ki | -0.2234257 | -0.2235012 | -0.2234420 | -0.2233393 | -0.2235486 | -0.2235069 | -0.2233264 | -0.2234355 | -0.2235838 | -0.2235114 | -0.2235404 | -0.2234404 | -0.2234457 | -0.2235303 | -0.2235800 |
| al2o3 | -0.6396653 | -0.6397526 | -0.6394446 | -0.6396495 | -0.6399722 | -0.6397662 | -0.6397155 | -0.6399259 | -0.6397224 | -0.6396259 | -0.6400388 | -0.6396554 | -0.6397950 | -0.6398037 | -0.6397137 |
| mgo | -0.5753499 | -0.5755680 | -0.5753260 | -0.5754690 | -0.5757790 | -0.5756159 | -0.5755352 | -0.5756656 | -0.5755493 | -0.5754456 | -0.5758712 | -0.5755070 | -0.5755998 | -0.5756842 | -0.5755619 |
| sio2 | -0.6220156 | -0.6222207 | -0.6219270 | -0.6221140 | -0.6224291 | -0.6222709 | -0.6221806 | -0.6223625 | -0.6221667 | -0.6221148 | -0.6225147 | -0.6221296 | -0.6222519 | -0.6222903 | -0.6221859 |
| k2cr2o7 | -0.3097732 | -0.3097145 | -0.3096960 | -0.3096694 | -0.3096364 | -0.3095843 | -0.3096663 | -0.3097040 | -0.3096777 | -0.3096817 | -0.3096102 | -0.3097174 | -0.3097609 | -0.3097414 | -0.3097651 |
| Training Set | | | | | | | | | | | | | | | |

FIG. 13A

| 50sec | nabr | nabr | nabr | nabr | nabr | nabr | nabr | nabr | nabr | nabr | nabr | nabr | nabr |
|---|---|---|---|---|---|---|---|---|---|---|---|---|---|
| na2co3 | 0.000004076 | 0.000003817 | 0.000004567 | 0.000003435 | 0.000004647 | 0.000003142 | 0.000003920 | 0.000003731 | 0.000003867 | 0.000003140 | 0.000004508 | 0.000003319 | 0.000004741 | 0.000002843 | 0.000003295 | 0.000003377 |
| caco3 | 0.000007364 | 0.000006904 | 0.000008252 | 0.000006209 | 0.000008404 | 0.000005688 | 0.000007087 | 0.000006748 | 0.000007027 | 0.000005681 | 0.000008141 | 0.000006008 | 0.000008570 | 0.000005140 | 0.000005959 | 0.000006107 |
| khco3 | 0.000002887 | 0.000002706 | 0.000003235 | 0.000002435 | 0.000003294 | 0.000002229 | 0.000002781 | 0.000002644 | 0.000002756 | 0.000002227 | 0.000003194 | 0.000002351 | 0.000003360 | 0.000002015 | 0.000002337 | 0.000002393 |
| nh4cl | 0.000003029 | 0.000002839 | 0.000003395 | 0.000002553 | 0.000003453 | 0.000002337 | 0.000002915 | 0.000002772 | 0.000002897 | 0.000002334 | 0.000003349 | 0.000002469 | 0.000003524 | 0.000002113 | 0.000002451 | 0.000002510 |
| nabr | 1.000000000 | 1.000000000 | 1.000000000 | 1.000000000 | 1.000000000 | 1.000000000 | 1.000000000 | 1.000000000 | 1.000000000 | 1.000000000 | 1.000000000 | 1.000000000 | 1.000000000 | 1.000000000 | 1.000000000 | 1.000000000 |
| nai | 0.000014343 | 0.000013444 | 0.000016075 | 0.000012092 | 0.000016364 | 0.000011073 | 0.000013802 | 0.000013139 | 0.000013683 | 0.000011057 | 0.000015855 | 0.000011698 | 0.000016669 | 0.000010010 | 0.000011606 | 0.000011888 |
| nacl | 0.000004038 | 0.000003784 | 0.000004529 | 0.000003403 | 0.000004604 | 0.000003116 | 0.000003886 | 0.000003696 | 0.000003848 | 0.000003112 | 0.000004464 | 0.000003291 | 0.000004699 | 0.000002817 | 0.000003268 | 0.000003347 |
| cacl2 2h2o | 0.000000000 | 0.000000000 | 0.000000000 | 0.000000000 | 0.000000000 | 0.000000000 | 0.000000000 | 0.000000000 | 0.000000000 | 0.000000000 | 0.000000000 | 0.000000000 | 0.000000000 | 0.000000000 | 0.000000000 | 0.000000000 |
| nh4br | 0.472230588 | 0.496989686 | 0.517388137 | 0.447029698 | 0.592209843 | 0.403473857 | 0.522487691 | 0.468299160 | 0.494700016 | 0.375810880 | 0.543263314 | 0.466350305 | 0.589641974 | 0.368088741 | 0.427120164 | 0.423385683 |
| kbr | 0.047493775 | 0.044658606 | 0.053146397 | 0.040166753 | 0.053940001 | 0.036798052 | 0.045912836 | 0.043495802 | 0.045371312 | 0.036775691 | 0.052287636 | 0.038450892 | 0.055260433 | 0.033146676 | 0.038484454 | 0.039281765 |
| kcl | 0.000015664 | 0.000014685 | 0.000017561 | 0.000013203 | 0.000017864 | 0.000012093 | 0.000015074 | 0.000014344 | 0.000014935 | 0.000012079 | 0.000017313 | 0.000012771 | 0.000018225 | 0.000010929 | 0.000012675 | 0.000012984 |
| ki | 0.000014386 | 0.000013485 | 0.000016124 | 0.000012129 | 0.000016414 | 0.000011106 | 0.000013844 | 0.000013179 | 0.000013724 | 0.000011091 | 0.000015903 | 0.000011733 | 0.000016740 | 0.000010040 | 0.000011641 | 0.000011924 |
| al2o3 | 0.000002951 | 0.000002763 | 0.000003308 | 0.000002487 | 0.000003364 | 0.000002275 | 0.000002838 | 0.000002701 | 0.000002813 | 0.000002273 | 0.000003265 | 0.000002402 | 0.000003433 | 0.000002058 | 0.000002386 | 0.000002445 |
| mgo | 0.000004716 | 0.000004416 | 0.000005283 | 0.000003973 | 0.000005376 | 0.000003635 | 0.000004535 | 0.000004316 | 0.000004497 | 0.000003633 | 0.000005215 | 0.000003840 | 0.000005484 | 0.000003289 | 0.000003812 | 0.000003906 |
| sio2 | 0.000003433 | 0.000003215 | 0.000003848 | 0.000002893 | 0.000003914 | 0.000002647 | 0.000003302 | 0.000003142 | 0.000003273 | 0.000002645 | 0.000003798 | 0.000002795 | 0.000003994 | 0.000002394 | 0.000002776 | 0.000002844 |
| k2cr2o7 | 0.000012014 | 0.000011264 | 0.000013467 | 0.000010130 | 0.000013716 | 0.000009281 | 0.000011569 | 0.000011005 | 0.000011464 | 0.000009262 | 0.000013283 | 0.000009805 | 0.000013981 | 0.000008385 | 0.000009724 | 0.000009961 |

FIG. 13B

| Duration | 1st Match | 2nd Match | SAMPLE |
|---|---|---|---|
| 30.27 | na2co3 : 0.06 | mgo : 0.18 | na2co3 |
| 50.85 | na2co3 : 0.04 | mgo : 0.16 | na2co3 |
| 15.44 | na2co3 : 0.10 | mgo : 0.24 | na2co3 |
| 15.36 | caco3 : 0.19 | cacl2h2o : 135.90 | caco3 |
| 30.27 | caco3 : 0.14 | cacl2h2o : 134.43 | caco3 |
| 50.56 | caco3 : 0.08 | cacl2h2o : 135.33 | caco3 |
| 15.36 | khco3 : 0.20 | kcl : 25.93 | khco3 |
| 30.84 | khco3 : 0.11 | kcl : 25.78 | khco3 |
| 50.56 | khco3 : 0.07 | kcl : 25.86 | khco3 |
| 15.28 | nh4cl : 0.23 | nacl : 6.90 | nh4cl |
| 30.24 | nh4cl : 0.13 | nacl : 6.65 | nh4cl |
| 50.8 | nh4cl : 0.09 | nacl : 7.01 | nh4cl |
| 15.05 | nabr : 0.21 | nh4br : 0.23 | nabr |
| 30.34 | nabr : 0.30 | nh4br : 0.34 | nabr |
| 50.49 | nabr : 0.14 | nh4br : 0.17 | nabr |
| 15.25 | nai : 0.11 | ki : 2.05 | nai |
| 30.14 | nai : 0.19 | ki : 2.31 | nai |
| 50.01 | nai : 0.11 | ki : 2.15 | nai |
| 15.24 | kbr : 0.56 | nabr : 0.79 | kbr |
| 30.49 | kbr : 0.56 | nabr : 0.71 | kbr |
| 50.81 | kbr : 0.41 | nabr : 0.64 | kbr |
| 15.43 | nacl : 0.21 | al2o3 : 5.65 | nacl |
| 30.47 | nacl : 0.11 | al2o3 : 5.86 | nacl |
| 50 | nacl : 0.09 | al2o3 : 5.91 | nacl |

FIG. 14A

| Duration | 1st Match | 2nd Match | SAMPLE |
|---|---|---|---|
| 15.51 | cacl2h2o : 0.25 | nacl : 9.94 | cacl2h2o |
| 30.01 | cacl2h2o : 0.15 | nacl : 10.02 | cacl2h2o |
| 50.69 | cacl2h2o : 0.10 | nacl : 10.04 | cacl2h2o |
| 15.04 | nabr : 0.12 | nhb4br : 0.14 | nhb4br |
| 30.55 | nabr : 0.10 | nhb4br : 0.12 | nhb4br |
| 50.19 | nh4br : 0.06 | nabr : 0.06 | nhb4br |
| 15.29 | kcl : 0.28 | nh4cl : 17.15 | kcl |
| 30.15 | kcl : 0.18 | nh4cl : 17.01 | kcl |
| 50.63 | kcl : 0.12 | nh4cl : 17.42 | kcl |
| 15.47 | ki : 0.29 | nai : 1.76 | ki |
| 30.55 | ki : 0.32 | nai : 1.77 | ki |
| 50.19 | ki : 0.27 | nai : 1.83 | ki |
| 15.3 | mgo : 0.16 | na2co3 : 0.24 | mgo |
| 30 | mgo : 0.09 | na2co3 : 0.16 | mgo |
| 50.8 | mgo : 0.07 | na2co3 : 0.13 | mgo |
| 15.36 | sio2 : 0.14 | al2o3 : 0.31 | sio2 |
| 30.64 | sio2 : 0.07 | al2o3 : 0.25 | sio2 |
| 50.62 | sio2 : 0.06 | al2o3 : 0.24 | sio2 |
| 15.41 | al2o3 : 0.56 | sio2 : 0.31 | al2o3 |
| 30.42 | al2o3 : 0.07 | sio2 : 0.26 | al2o3 |
| 50.03 | al2o3 : 0.05 | sio2 : 0.22 | al2o3 |

FIG. 14B

DEVICES AND METHODS FOR DETECTING ELEMENTS IN A SAMPLE

CROSS-REFERENCE TO RELATED APPLICATIONS

The present application claims the priority benefit from U.S. Patent Application Ser. No. 62/871,570, filed Jul. 8, 2019, which is hereby incorporated by reference herein in its entirety for all purposes.

FIELD OF THE INVENTION

The present invention relates to devices and methods for identifying elements, atoms and compounds within a sample using a portable device including an X-ray source, where characteristic spectral features for elements within the compound may or may not be visible using a portable X-ray fluorescence spectroscopy device.

BACKGROUND OF THE INVENTION

Portable X-ray fluorescence (XRF) instruments, such as field portable devices, are used by inspectors throughout the world to determine the elemental distributions in a wide variety of sample matrices including soils, minerals, ceramics, metals, polymers, thin films, and paint on different substrates. The Thermo Scientific NITON XL5, for example, employs various algorithms to properly analyze the elemental composition in these different sample matrices. In general, a given instrument will be used in a specific instance for the analysis of a single class of samples, for example, sorting of alloys, or the analysis of soil samples, or analysis of the paint in houses. In such cases, the most effective use of the analyzer is to operate in a mode specifically developed to optimize performance for the sample class. The user selects from a menu on a touch screen or an associated computer, or the analyzer may perform automated routines to select the mode without user interventions. The Thermo Scientific NITON XL5 can be used to analyze various elements or atoms or compounds in a sample where the elements or atoms or compounds exhibit primary elemental spectral features using X-ray fluorescence. See for example U.S. Pat. Nos. 7,899,153; 7,170,970; and 7,430,274, each of which is hereby incorporated by reference herein in its entirety for all purposes.

However, such field portable devices may not be able to identify certain compounds in a sample due to some, or all, of the elemental constituents lacking detectable primary X-ray fluorescence spectral features in response to the X-ray source of the portable device. A need therefore exists for methods of using a portable device that can identify certain compounds in a sample where primary X-ray fluorescence spectral features of constituent elements are not distinguishable.

SUMMARY

Aspects of the present disclosure are directed to devices and methods, such as those presented in a portable device, that identifies a compound in a sample where primary X-ray fluorescence spectral features are not readily distinguishable. The present disclosure provides for the identification of or confirmation of the identity of a test compound, as is sometimes desirable in an industry where the identity of a compound needs to be validated.

According to one aspect, a device and method is described herein that can detect and/or identify and/or quantify salt compounds or oxide compounds. According to a certain aspect, the device and method described herein can be used to detect and/or identify and/or quantify an ionic salt or oxide. A compound, such as a salt compound or oxide, can be detected, identified and/or quantified using the device and the methods described herein, which do not rely on wet chemical methods.

As is known in the art of X-ray fluorescence detection using handheld field portable devices, one or more atoms or elements of a test compound, such as magnesium or higher, can be detected based on characteristic fluorescence peaks generated in response to X-rays at a first voltage level so as to detect, identify or quantify a test compound being analyzed. According to the present disclosure, reference to "element" or "atom" can be used interchangeably insofar as the element can be identified if it is in its elemental state, atomic state or ionic state. According to one aspect, the test compound of the present disclosure includes one or more elements that do not exhibit a detectable or distinguishable fluorescence peak at the first voltage level, such as elements having an atomic weight lower than magnesium, and so a positive identification of the test compound cannot be determined based on the primary elemental spectral fluorescence peaks alone. However, the fluorescence peaks obtained at the first voltage level can be used to identify possible identities of the test compound from within a library of compounds by selecting a subset of library compounds with the same elements identified by the fluorescence peaks. In accordance with the present disclosure, a second spectrum of the test compound is obtained using X-rays at a second higher voltage level. The second spectrum or portion of the second spectrum is matched to a reference spectrum of a compound within the subset of library compounds to identify the test compound. According to the present disclosure, reference spectra at the second higher voltage level are obtained for a plurality of compounds to form a library of reference spectra to be compared with test spectra at the second higher voltage level. In addition to the specific methods disclosed herein, methods of determining whether a test spectrum matches a reference spectrum are known to those of skill in the art and can be utilized in the present disclosure.

According to one aspect, a portable device is provided which can be used to detect, identify and/or quantify a test compound including elements which exhibit a primary elemental x-ray fluorescence spectral feature and elements which do not exhibit a primary elemental x-ray fluorescence spectral feature. One or more primary elemental x-ray fluorescence spectral features are obtained at a first voltage level to identify candidate compounds and then a second spectrum is obtained at a second voltage level higher than the first voltage level. The second spectrum or portion of the second spectrum is matched to a reference spectrum of a candidate compound to identify the test compound.

According to one aspect, a portable device is provided which can be used to detect, identify and/or quantify a test compound including elements having a molecular weight lower than magnesium and elements having a molecular weight of magnesium and higher. One or more primary elemental X-ray fluorescence spectral features are obtained at a first voltage level to identify candidate compounds and then a second spectrum is obtained at a second voltage level higher than the first voltage level. The second spectrum is matched to a reference spectrum of a candidate compound to identify the test compound.

The present disclosure has application in detecting, identifying and/or quantifying chemical compounds such as salts or oxides where the elements of such salts or oxides include one or more or all atoms which do not exhibit, produce or generate detectable or distinguishable primary elemental X-ray fluorescence spectral features or peaks in response to X-ray interrogation.

Further features and advantages of certain embodiments of the present disclosure will become more fully apparent in the following description of the embodiments and drawings thereof, and from the claims. According to representative methods, one or more conventional steps, such as those associated with sample preparation, may be simplified or even omitted.

BRIEF DESCRIPTION OF THE DRAWINGS

The foregoing and other features and advantages of the present embodiments will be more fully understood from the following detailed description of illustrative embodiments taken in conjunction with the accompanying drawings in which:

FIG. 3A illustrates a table of salt and oxide compounds of interest and their corresponding density and u values.

FIG. 3C illustrates the corresponding data table for the plot of FIG. 3B.

FIG. 4A illustrates a statistical t-test fitting model based on the least squared method for both the slope and offset.

FIG. 4B illustrates a statistical scaling of the t-score results to a D value that is between 0 and 1, with 1 being a perfect fit.

FIG. 5 illustrates a table of the regions of interest for the characteristic peaks for elements normally detectable with handheld XRF.

FIG. 6 illustrates a table of D value slope fits between the evaluation set and the training set for a 30 second measurement.

FIG. 7 illustrates a table of t score slope fits between the evaluation set and the training set for a 30 second measurement.

FIG. 8 illustrates is a table of D value offset fits between the evaluation set and the training set for a 30 second measurement.

FIG. 9 illustrates a table oft score offset fits between the evaluation set and the training set for a 30 second measurement.

FIG. 12A illustrates a table of the calculated t-score for NaBr and NH4Br at 10, 20, and 30 seconds.

FIG. 12B illustrates a table of the calculated t-score for NaBr and NH4Br at 10, 20, and 30 seconds.

FIG. 13A illustrates a table of the calculated t-score of the slope for a 50 second measurement.

FIG. 13B illustrates a table of the calculated D value of the slope for a 50 second measurement.

FIGS. 14A-B illustrate an example matching table showing $1^{st}$ and $2^{nd}$ match results for 15, 30, and 50 seconds.

Figure 1:
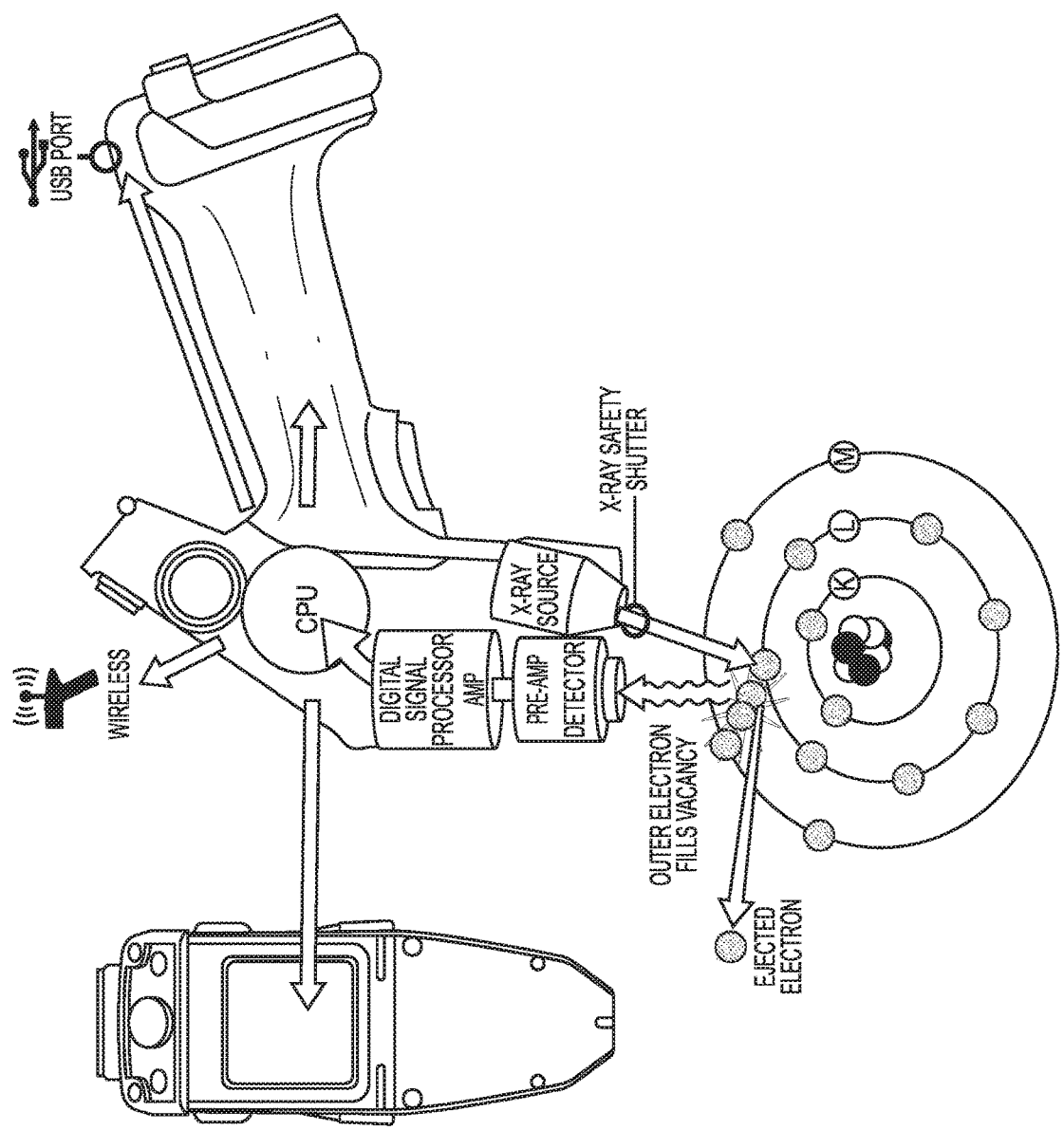
FIG. 1 illustrates an exemplary handheld X-ray fluorescence device flowchart of the methods described herein.

The figures should be understood to present an illustration of an embodiment of the invention and/or principles involved. As would be apparent to one of skill in the art having knowledge of the present disclosure, other devices, methods, and analytical instruments will have configurations and components determined, in part, by their specific use. Like reference numerals refer to corresponding parts throughout the several views of the drawings.

Like reference numerals refer to corresponding parts throughout the several views of the drawings.

DETAILED DESCRIPTION OF EMBODIMENTS

The present disclosure provides devices and methods for identifying a compound using an X-ray source in a portable device. The X-ray source can generate or emit X-rays using different voltage levels. The X-rays at a first voltage level can be used to generate a primary elemental X-ray fluorescence spectrum from a compound. The X-rays at a second voltage level higher than the first voltage level can be used to generate a second spectrum from the sample. The device, which may be field portable or hand held, includes one or more microprocessors, databases or software programs to identify and/or store and/or compare spectra, as well as, to implement one or more algorithms used to compare spectra or parts of spectra to identify a test compound from among known candidate compounds. Certain algorithms and quantification methods using X-ray fluorescence are described in U.S. Pat. No. 7,899,153 hereby incorporated by reference in its entirety.

According to one aspect, the portable device generates and transmits X-ray radiation toward a sample for analysis. The sample is illuminated with X-rays generated at a first voltage level and X-ray fluorescence is detected by a detector within the device if elements are present in the sample that emit fluorescence in response to X-rays. X-ray fluorescence is detected and analyzed from the sample, for example using a peak identification algorithm to determine the presence of the peaks. The X-ray fluorescence for each element is represented by a spectral peak or peaks, i.e. a primary elemental X-ray fluorescence spectrum. Based on the primary elemental X-ray fluorescence spectrum, the device selects one or more candidate compounds that each include all of the identified elements as well as one or more un-identified elements from among a stored library of compounds, to produce a subset of library compounds. It is to be understood that the subset can be created by selecting library compounds including all of the identified elements of the test compound or by deselecting library compounds that do not include all of the identified elements of the test compound. If the device identifies an element that is not present in a member of the library, then that member of the library cannot be the correct compound and is excluded. If one or more members in the library include an element that is not identified by the normally detectable characteristic peak identified by X-ray fluorescence from the sample, then the one or more members are excluded as possible compounds in the sample.

According to one aspect, the test compound includes further elements that do not exhibit a primary elemental X-ray fluorescence spectrum in response to the first voltage level. According to this aspect, the sample is illuminated with X-rays generated at a second voltage level that is higher than the first voltage level and a second spectrum is detected by the detector in the device. The second spectrum is compared with reference spectra obtained at the second voltage level of the subset of library compounds. If the second spectrum substantially matches a reference spectrum of a candidate compound within the subset of library compounds, then the test compound is identified as the candidate compound.

According to one aspect, a method is provided that utilizes a library or training set of compounds with associated standards of X-ray fluorescence spectra. The compounds also have an associated reference spectrum obtained using X-rays generated at the second voltage described herein. The library can be created by illuminating known compounds with X-rays generated by the second voltage, detecting the second spectrum and saving the second spectrum as a reference for the known compound with known molecular formula for comparison with a test second spectrum. The library can include any number of compounds.

According to the present disclosure, a portable device is provided that can identify a test compound that includes one or more elements with primary X-ray fluorescence spectra at a first voltage level and one or more elements which have no discernable or detectable primary X-ray fluorescence spectra at the first voltage level. Aspects of the present disclosure use a combination of primary X-ray fluorescence spectra obtained at a first voltage level and a second spectrum of the test compound obtained at a second voltage level higher than the first voltage level.

According to one aspect, the portable device uses a computer implemented algorithm to compare the second spectrum to the reference spectra of the subset of library compounds to identify or confirm the identity of the test compound. According to this aspect, the second spectrum is detected and analyzed, such as by partitioning the full spectrum, such as between 2-40 keV, into different regions of interest ("ROI"), such as from 2.4 to 2.6 keV. Weighting factors may be applied to each region of interest to weight spectral features according to the importance of the spectral feature for identification. The weighting factors may be dynamically modified based on the sample and what compound is believed to be present in the sample.

According to one aspect, a least squares slope and intercept may be calculated comparing an entry in the library with the spectrum obtained from the sample being analyzed. A perfectly matched sample spectrum to a library spectrum will have a slope of 1.0 and an intercept of 0. For example, a score (C-Val) is calculated for each potential match using the square roots sum of squares for slope and intercept according to C-Val=1.0−sqrt ((slope$^2$)+offset$^2$)).

According to one aspect, the compound being analyzed may be suspected or known, and the method can be used to confirm the identity of the sample. Accordingly, the suspected or known identity of the compound or other assumptions about the compound can be input by the user into the method and the sample compound can be analyzed for similarity to the input compound. Alternatively, the compound being analyzed may be unknown and the method can be used to identify the compound of the sample. In this manner, the portable device can analyze and identify a compound that includes elements with a primary elemental X-ray fluorescence spectral feature (such as elements with an atomic weight of magnesium or higher), and elements without a primary elemental X-ray fluorescence spectral feature (such as elements with an atomic weight of lower than magnesium). Such a device is especially useful in identifying salts which include sodium, lithium, or beryllium or oxides.

A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an embodiment consisting entirely of hardware including one or more microprocessors, an embodiment consisting entirely of software, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are understood by those of skill in the art or as described herein. It is noted that these connections are general and, unless specified otherwise, may be direct or indirect, wired or wireless, and that the specification is not intended to be limiting in this respect.

Accordingly, the present disclosure is directed to a method of identifying a compound by obtaining a first X-ray fluorescence spectrum of the compound at a first voltage level, identifying one or more elements from one or more corresponding peaks of the X ray fluorescence spectrum, selecting compounds within a library of compounds including the one or more elements and creating a subset of selected compounds, obtaining a second spectrum of the compound at a second voltage level higher than the first voltage level, comparing the second spectrum to reference spectra of the selected compounds of the subset generated at the second voltage level, and identifying the compound by matching the second spectrum to a reference spectrum corresponding to a selected compound. According to one aspect, the one or more elements have an atomic weight of magnesium or higher. According to one aspect, the compound includes one or more elements having an atomic weight lower than magnesium. According to one aspect, the compound is a salt or oxide compound including one or more elements having an atomic weight lower than magnesium. According to one aspect, the library of compounds comprises salt or oxide compounds that cannot be discriminated by X-ray fluorescence characteristic peak analysis alone. According to one aspect, the second spectrum is matched to a reference spectrum using a linear fitting model to compare and match the shape of the second spectrum to the shape of the reference spectrum. According to one aspect, the second spectrum is matched to a reference spectrum using a least squares slope and intercept method, and wherein the shape of the second spectrum is matched to the shape of the reference spectrum by a calculated slope of 1.0 and an intercept of 0. According to one aspect, one or more microprocessors, one or more electronic databases and one or more software programs are used (1) to identify the one or more elements from the first X-ray fluorescence spectrum of the compound at a first voltage level, (2) to select compounds within the library of compounds, (3) to compare the second spectrum to the reference spectra of the selected compounds of the subset, and (4) to identify the compound by matching the second spectrum to a reference spectrum corresponding to a selected compound. According to one aspect, one or more regions of interest of the second spectrum is compared to the reference spectra of the selected compounds of the subset, and the compound is identified by matching the one or more regions of interest of the second spectrum to a reference spectrum corresponding to a selected compound. According to one aspect, a weighting factor is applied to one or more regions of interest of the second spectrum for comparison of the one or more regions of interest to the reference spectra of the selected compounds of the subset using a linear fitting model. According to one aspect, a weighting factor is dynamically applied to one or more regions of interest of the second spectrum for comparison of the one or more regions of interest to the reference spectra of the selected compounds of the subset using a linear fitting model. According to one aspect, the first X-ray fluorescence spectrum of the compound is obtained by illuminating the compound with X-ray radiation generated at a first voltage level of between 3 and 9 keV for 3 to 30 seconds using a first filter. According to one aspect, the second spectrum of the compound is obtained by illuminating the compound with X-ray radiation generated at a second voltage level of between 30 and 60 keV for 30 to 300 seconds using a second filter.

EXAMPLE I

Field Portable Devices

According to one aspect, a portable XRF device is described herein to carry out the methods described herein. Suitable portable, field portable or handheld XRF devices known in the art may be modified by hardware or software to carry out the methods described herein. Exemplary and useful field portable XRF devices include the Thermo Scientific NITON XL5. Such devices carry out nondestructive analysis of a sample compound or material.

According to one aspect, the portable device is used to carry out the nondestructive XRF analysis of a sample to identify a compound within the sample. XRF analyzers determine the chemistry of a sample by measuring the fluorescent (or secondary) X-ray emitted from a sample when it is excited by an X-ray source. Elements present in a sample produce a set of characteristic X-rays unique for that element. An exemplary handheld device is shown in FIG. 1 as including an X-ray source and a detector. The detector is operatively connected to a digital signal processor which is operatively connected to a computer processing unit adapted for use in portable, handheld, battery operated devices. The onboard computer processing unit is capable of performing the necessary functions described herein to provide answers at the point of use while still remaining compatible with the requirements of portable devices. The portable device can optionally be connectedly wirelessly or by USB port to a computer network to provide additional capabilities including data transmission, instrument condition monitoring, device management, and additional computing resources for more advanced offline analysis. The handheld device includes a display unit for displaying information or for inputting information or for selecting various analysis modes offered by the handheld device.

According to one aspect, the handheld device can operate (1) at a selected voltage of between 4 kV and 60 kV, (2) at a selected current of up to 1000 uA, (3) using a filter selected from among Al, Cu, Fe, Mo, or no filtration, including combinations thereof, and (4) for a selected period of time of between 3 and 300 seconds.

Atoms responsive to X-rays have several electron orbitals (K shell, L shell, M shell, for example). When X-ray energy causes electrons to transfer in and out of these shells, XRF peaks with varying intensities are created and will be present in the spectrum which is a graphical representation of X-ray peaks as a function of energy. The peak energy identifies the element, and the peak height/intensity is generally indicative of the concentration of the element in the sample. X-ray fluorescence methods are known to those of skill in the art and can be utilized in the present methods based on the present disclosure.

EXAMPLE II

XRF Methods

Figure 2:
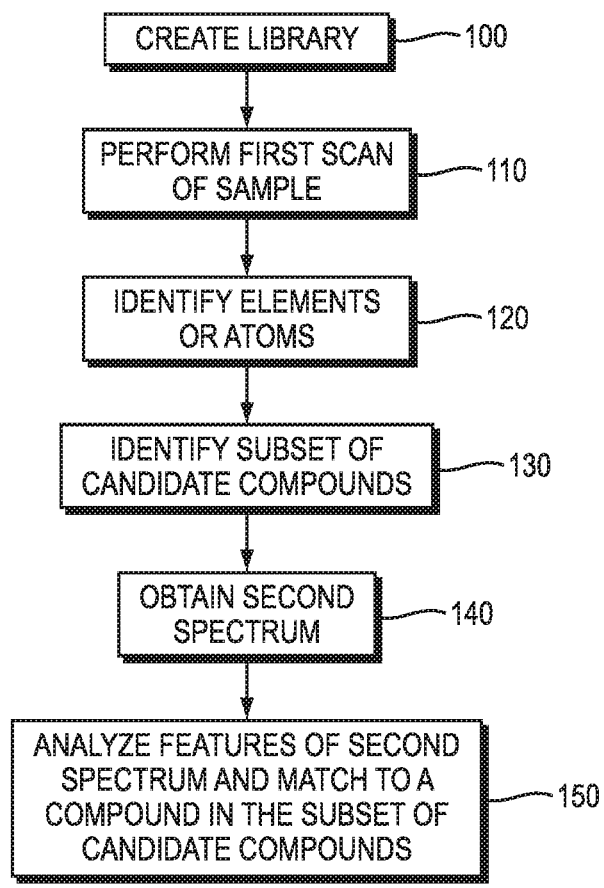
FIG. 2 illustrates a flowchart of methods described herein.

According to one aspect depicted in the flow diagram of FIG. 2, a library of spectra of known compounds is stored in the handheld device. Such a library can be created by entering the molecular formula of the compound into the device and scanning the compound (1) at a selected voltage, (2) at a selected current, (3) using a selected filter, and (4) for a selected period of time. The device detects the fluorescent emissions from the compound the stores the associated spectral information in the memory of the device. The process is generally repeated for each compound of interest to create the library. Alternatively, a pre-created library can be uploaded into the device via the wireless or USB connection. See Step 100. For example, a user may upload or enter a compound identifier (e.g. a formula or other identifier known in the art) into the device and perform a first scan of the compound. The first scan may be executed using a "high" voltage, such as a voltage of about 50 kV at a selected current such as 5 uA for a time period of about 3-30 seconds, and the fluorescent emission from the compound detected. In some cases, it may be desirable to use a filter in front of the detector and/or tube to remove noise from the fluorescent signal that is not related to the compound itself.

In a first scan using a first preconfigured set of conditions, a sample, which may be known or unknown, is irradiated with X-rays emanating from within the handheld device. First scan irradiation is typically performed using an X-ray tube as a source, wherein the endpoint energy of the X-ray tube can be from 4 kV to 10 kV. The X-ray emitted by the source is normally not filtered in such low energy measurements that are desirable for detection of light elements, but can be filtered to optimize the excitation spectrum as has been demonstrated in the art. The use of an X-ray source, such as an X-ray tube, and the use of a window and/or elemental filter, such as a Cu filter or otherwise, are standard XRF techniques, described, for example, in U.S. Pat. No. 6,765,986, to Grodzins et al., which is incorporated herein by reference. In the first scan, radiation scattered by, and/or resonantly emitted (fluoresced) by, the sample is detected and sorted in terms of energy within the handheld analyzer. See Step 110. An exemplary first preconfigured set of irradiation parameters is between 5 to 8 keV for a time period of about 3-30 seconds. As described above, it may be desirable to use a filter in front of the detector to remove noise from the fluorescent signal. The first set of preconfigured irradiation parameters is particularly advantageous for the detection of fluorescence lines of elements that include K, Cl, Mg, Ca or S. Such elements are low Z (or light elements) elements where characteristic L lines can be seen with hand held XRF devices.

The signal processor then analyzes the detected fluorescence to identify one or more elements or atoms. See Step 120. For example, the signal processor and/or CPU may perform analysis to identify characteristic peaks in the detected spectrum from the sample indicative of one or more light elements or atoms.

The signal processor and/or CPU then compares the identified elements or atoms from the sample to the library of compounds to produce a subset of possible compounds. For example, compounds within the library that do not possess the identified one or more elements or atoms are not selected as possible compound matches for the subset. Further, if the processor and/or CPU fails to identify any elements or atoms, then compounds within the library that possess "light elements" are not selected as possible compound matches for the subset. See Step 130.

The sample is then subject to a second higher voltage scan using a second preconfigured set of irradiation parameters. An exemplary second preconfigured set of irradiation parameters is between 30 to 50 kV at 5 uA to 10 uA for a time period of about 3-30 seconds to obtain a second spectrum. As described above, it may be desirable to use a filter in front of the detector and/or tube to remove noise from the fluorescent signal. See Step 140.

The resulting spectral features from the second higher voltage scan are then compared to the spectral information in the subset of compounds selected from the library. According to one aspect, the signal processor and/or CPU calculates a least squares slope and intercept that compares an entry in the subset of candidate compounds with the features of the spectrum obtained from the sample being analyzed. The signal processor and/or CPU selects the best match and identifies the sample as the compound associated with the best match. See Step 150. For example, a perfectly matched sample spectrum to a spectrum in the subset will have a slope of 1.0 and an intercept of 0. A score (C-Val) is calculated for each potential match using the square roots sum of squares for slope and intercept according to C-Val=1.0−sqrt $((slope^2)+offset^2))$. Further, in some applications, an algorithm may be used to first separate the detected spectrum into different regions of interest and weighting factors may be applied to one or more regions of interest to weight spectral features important to identification. The weighting factors are dynamically modified based on the sample and what compound is believed to be present in the sample.

EXAMPLE III

Analysis of Ionic Salts and Oxides

Figure 3B:
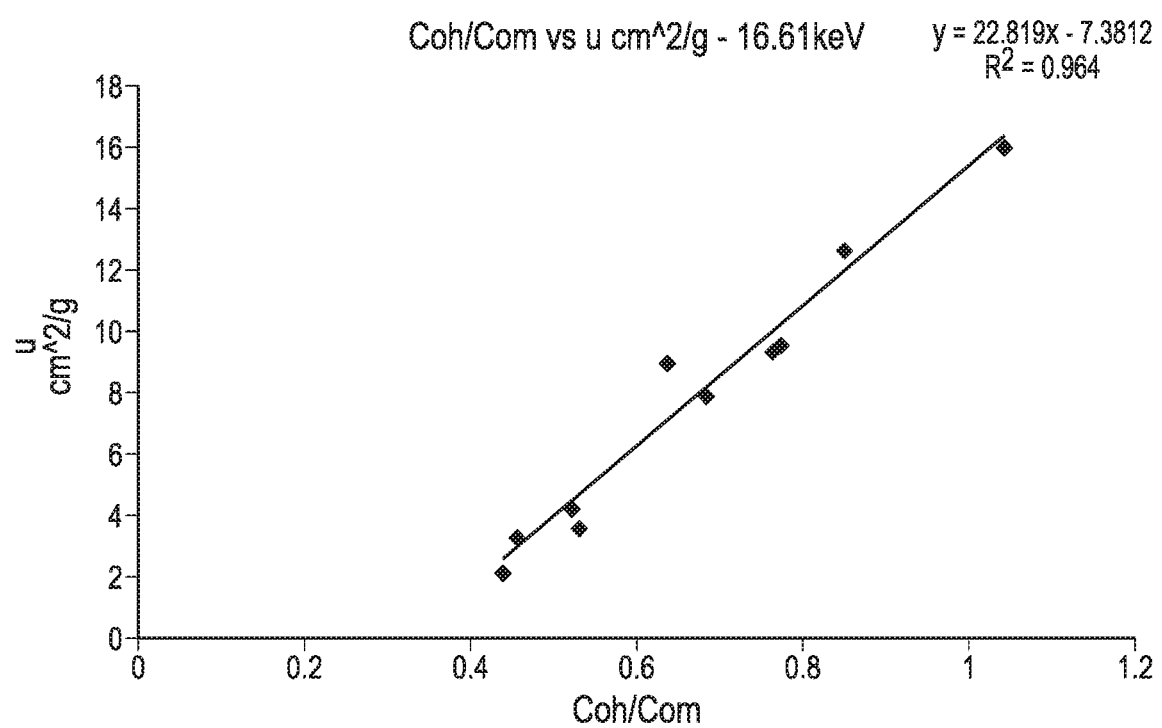
FIG. 3B illustrates a plot of the elastic over inelastic scatter versus the u value at 16.61 keV for a subset of the compounds of FIG. 2.

A Thermo Niton XL2 980 SDD handheld device with a 45 kV Ag anode X-ray tube with a variable tube current, an 8 mm X-ray spot and a Mo primary filter was used to analyze the following thirteen ionic salts and three oxides: $Na_2CO_3$, $CaCO_3$, $KHCO_3$, $NH_4Cl$, NaBr, NaI, NaCl, $CaCl_2$, $NH_4Br$, KBr, KCl, KI, $Al_2O_3$, MgO, $SiO_2$, and $K_2Cr_2O_7$. A library of second spectra of each of the known compounds ("training set") was created by illuminating each substance for 100 seconds at a voltage of 45 kV. Test samples ("evaluation set") were illuminated for 30, 20 and 10 seconds. FIGS. 3A, 3B and 3C depict the coherent over Compton peaks for certain of the salts or oxides. As evidenced in the graph of FIG. 3B, the Coh/Com ratio graphed against the u gives a best fit line with an R2 value of >0.96 for the 16.61 keV Compton line of the salts and oxides tested. FIG. 3C is the tabular representation of this data.

Each spectrum from the evaluation set was iteratively compared using a linear fitting model to each spectrum from the training set. For each iteration, the following parameters were calculated: Correlation Coefficient $R^2$; Slope; Offset; Error Slope; Error Offset; t-stat Slope; D oft score−$0 \le D \le 1$; P-value Slope; t-Stat Offset; and P-value Offset. D oft score was used as matching criteria. The fitting model is described in FIGS. 4A and 4B. While the described embodiment shows a least squares estimator of both slope and offset, it will be appreciated that higher order fitting statistic can be used. The matching criteria, D, is shown in FIG. 4B. In this embodiment, the t-score is scaled from zero to one to provide a consistent matching score with 1 being a perfect fit and approaching zero as the fit becomes worse. Again, it should be appreciated that the scaling could be adapted statistically such that a relative fit scale could be established. For instance, a perfect fit of 1 could be used, and a scaling to a larger negative number could indicate a decreasing likelihood of match. In such a manner, the matching could be scaled from best to worst in the event that the user would not only like to know the best match, but any number of subsequent less ideal matches. The defined Regions of Interest used are shown in FIG. 5. These regions of interest correspond to the characteristic peaks of the elements and include a range of energy in keV. Bands around the characteristic peaks are selected as regions of interest to allow for later integration for quantitative analysis via traditional XRF analysis techniques. These regions of interest can be adapted depending on the library of elements and the specific operating characteristics of the device. The Correlation Coefficient $R^2$ derived from the training set versus the evaluation set from a samples at 30 seconds is shown in FIG. 6; the slope derived from the training set versus the evaluation set from the samples at 30 seconds is shown in FIG. 7; and the t-slope derived from the training set versus the evaluation set from the samples at 30 seconds is shown in FIG. 8; and the D-t score slope derived from the training set versus the evaluation set from the samples at 30 seconds is shown in FIG. 9. The circled regions illustrated in FIGS. 6-9 highlight compounds that are particularly difficult to distinguish from each other, notably NaBr, $NH_4Br$, and KBr. Importantly, the D-t score slope illustrated in FIG. 9 shows perfect match for each of these compounds (e.g. 1.0000000), with the mismatches having a score that easily distinguishes them as an incorrect match.

Figure 10A:
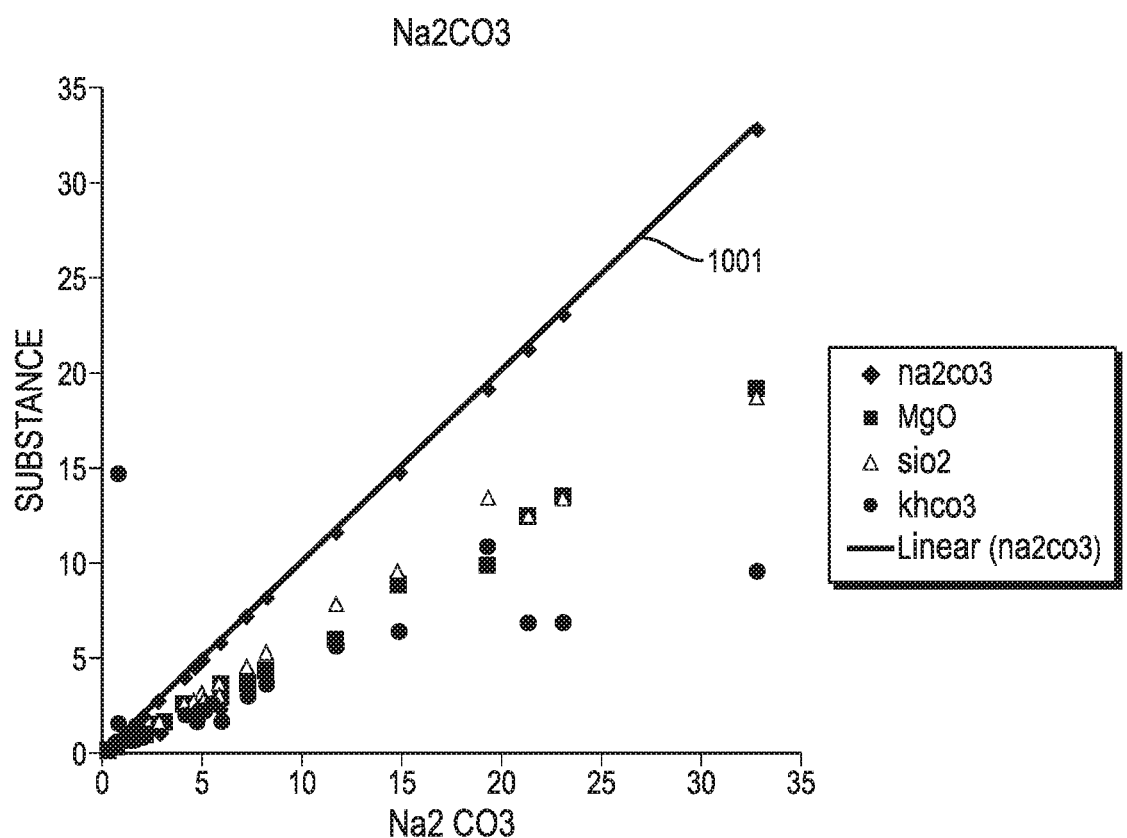
FIG. 10A illustrates an example of the plot fitting for Na2CO3 versus training set elements.
Figure 10B:
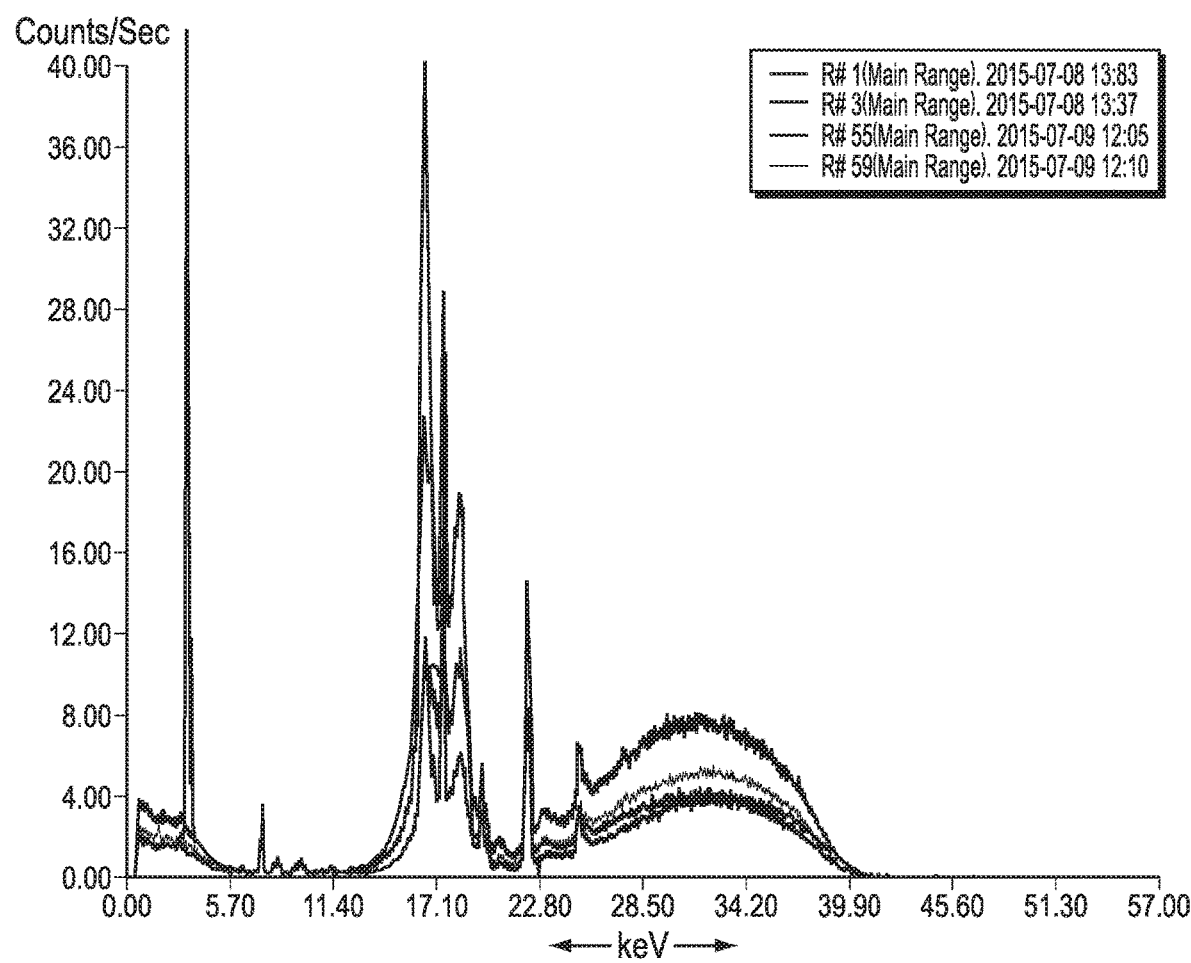
FIG. 10B illustrates an overlay of the spectral plots for the various samples compared to Na2CO3.

FIG. 10A depicts use of a linear fitting algorithm to match the test second spectrum of $Na_2CO_3$ sample compound to a reference second spectrum for $Na_2CO_3$ (line 1001) where the slope is 1.000 with an offset of 0.000. FIG. 10B depicts an overlay of all of the spectra on a plot for comparison.

Figure 11A:
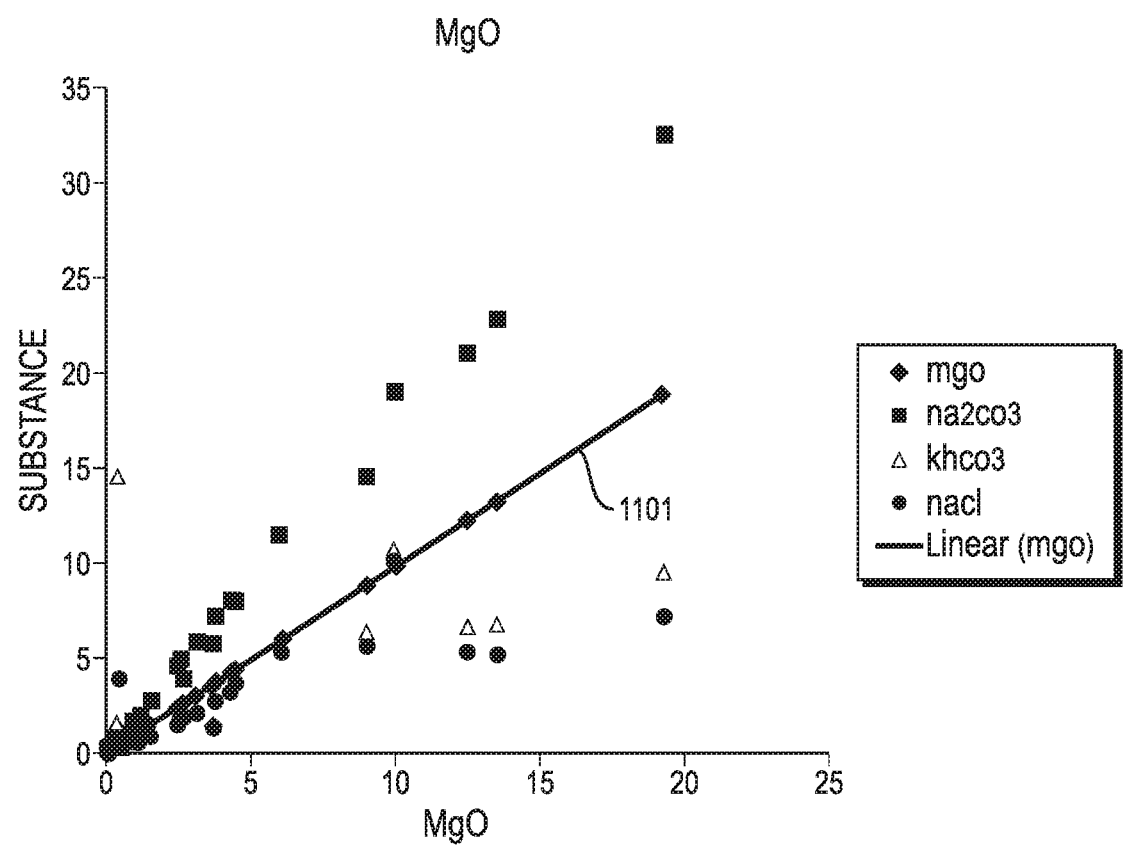
FIG. 11A illustrates an example of the plot fitting for MgO versus training set elements.
Figure 11B:
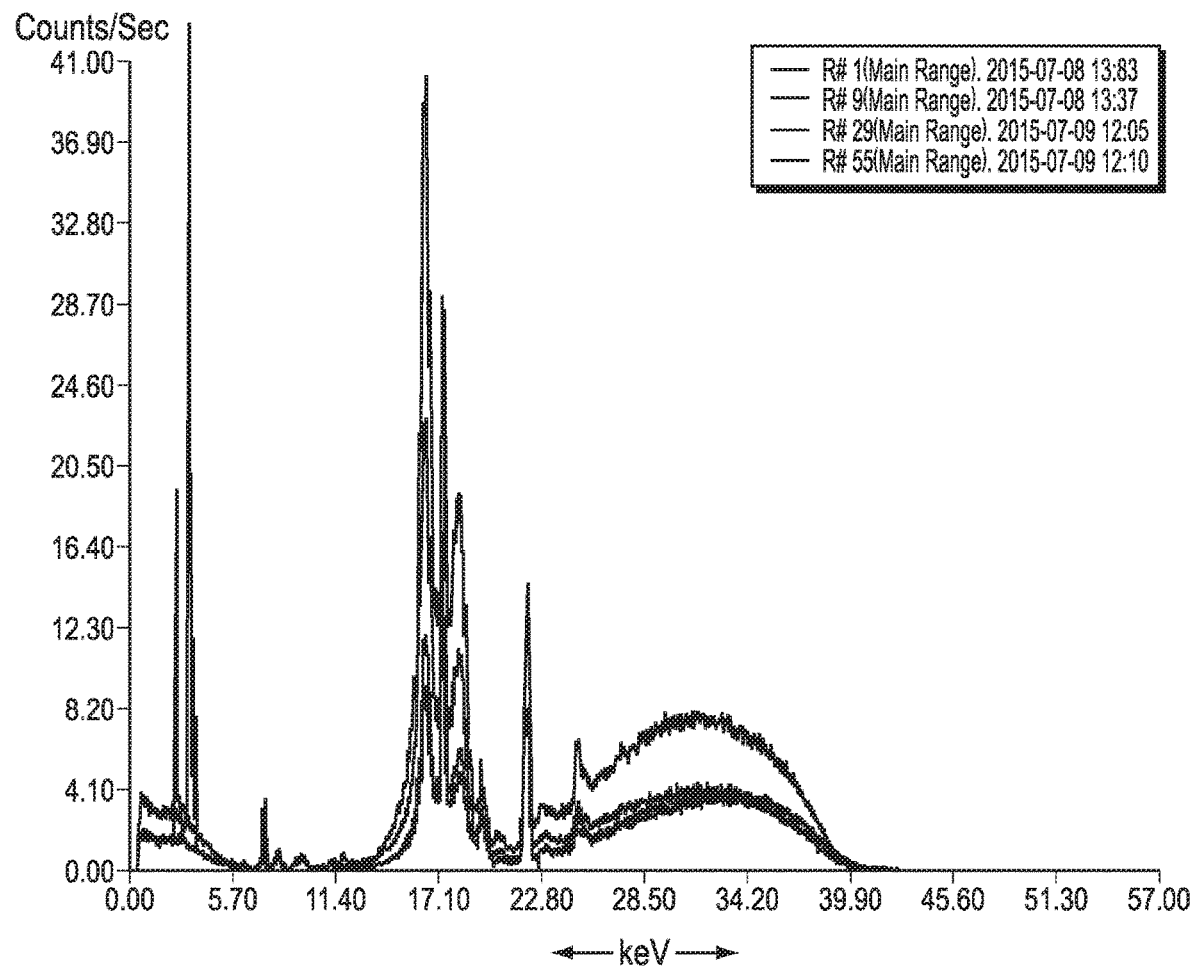
FIG. 11B illustrates an overlay of the spectral plots for the various samples compared to MgO.

FIG. 11A depicts use of a linear fitting algorithm to match the test second spectrum of MgO to a reference second spectrum for MgO (line 1101) where the slope is 1.000 with an offset of 0.000. FIG. 11B depicts an overlay of all of the spectra on a plot for comparison.

FIG. 12A depicts data calculations for t as indicated for NaBr and $NH_4Br$ at 30 seconds, 20 seconds and 10 seconds. FIG. 12B depicts data calculations for D as indicated for NaBr and $NH_4Br$ at 30 seconds, 20 seconds and 10 seconds. These tables show the positive identification of the NaBr and $NH_4Br$ at 10 seconds, 20 seconds, and 30 seconds measurement times. As shown in the table of FIG. 12B, the primary identification for each compound is accurate and the next best identification is indeed the other Br containing compound. Using standard characteristic peak analysis alone, one would not be able to make a determination between these compounds.

FIG. 13A depicts the calculated t-score for various salt and oxide compounds at 50 seconds. FIG. 13B depicts calculated d-score for various salt and oxide compounds at 50 seconds.

FIGS. 14A-B depicts data for spectra collected at roughly 15, 30 and 50 seconds and the resulting matching of the evaluation set compounds to the training set. Column 1 is the best matched compound, column 2 is the next best match. Column three is the actual sample under evaluation. As can been seen in the table the evaluation to actual is accurately correlated. For example, in FIG. 14B NaBr and NH$_4$Br are very difficult to distinguish, but can be correctly matched with sufficient time to acquire the spectral features in the second scan.

Those having skill in the art, with the knowledge gained from the present disclosure, will recognize that various changes can be made to the disclosed apparatuses and methods in attaining these and other advantages, without departing from the scope of the present invention. As such, it should be understood that the features described herein are susceptible to modification, alteration, changes, or substitution. The specific embodiments illustrated and described herein are for illustrative purposes only, and not limiting of the invention as set forth in the appended claims. Other embodiments will be evident to those of skill in the art. It should be understood that the foregoing description is provided for clarity only and is merely exemplary. The spirit and scope of the present invention are not limited to the above examples but are encompassed by the following claims. All publications and patent applications cited above are incorporated by reference in their entirety for all purposes to the same extent as if each individual publication or patent application were specifically and individually indicated to be so incorporated by reference.

What is claimed is:

1. A method of identifying a compound comprising:
   obtaining a first X ray fluorescence spectrum of the compound at a first voltage level,
   identifying one or more elements from one or more corresponding peaks of the X ray fluorescence spectrum,
   selecting compounds within a library of compounds including the one or more elements and creating a subset of selected compounds,
   obtaining a second X ray fluorescence spectrum of the compound at a second voltage level higher than the first voltage level,
   comparing the second X ray fluorescence spectrum to reference spectra of the selected compounds of the subset generated at the second voltage level, and
   identifying the compound by matching the second X ray fluorescence spectrum to a reference spectrum corresponding to a selected compound.

2. The method of claim 1 wherein the one or more elements have an atomic weight of magnesium or higher.

3. The method of claim 1 wherein the compound includes one or more elements having an atomic weight lower than magnesium.

4. The method of claim 1 wherein the compound is a salt or oxide compound including one or more elements having an atomic weight lower than magnesium.

5. The method of claim 1 wherein the library of compounds comprises salt or oxide compounds that cannot be discriminated by X ray fluorescence alone.

6. The method of claim 1 wherein the second X ray fluorescence spectrum is matched to the reference spectrum using a linear fitting model to compare and match the shape of the second spectrum to the shape of the reference spectrum.

7. The method of claim 1 wherein the second X ray fluorescence spectrum is matched to the reference spectrum using a least squares slope and intercept method, and wherein the shape of the second X ray fluorescence spectrum is matched to the shape of the reference spectrum by a calculated slope of 1.0 and an intercept of 0.

8. The method of claim 1 wherein one or more microprocessors, one or more electronic databases, and one or more software programs are used (1) to identify the one or more elements from the first X ray fluorescence spectrum of the compound at the first voltage level, (2) to select compounds within the library of compounds, (3) to compare the second X ray fluorescence spectrum to the reference spectra of the selected compounds of the subset, and (4) to identify the compound by matching the second X ray fluorescence spectrum to a reference spectrum corresponding to a selected compound.

9. The method of claim 1 wherein one or more regions of interest of the second X ray fluorescence spectrum is compared to the reference spectra of the selected compounds of the subset, and the compound is identified by matching the one or more regions of interest of the second X ray fluorescence spectrum to a reference spectrum corresponding to a selected compound.

10. The method of claim 1 wherein a weighting factor is applied to one or more regions of interest of the second X ray fluorescence spectrum for comparison of the one or more regions of interest to the reference spectra of the selected compounds of the subset using a linear fitting model.

11. The method of claim 1 wherein a weighting factor is dynamically applied to one or more regions of interest of the second X ray fluorescence spectrum for comparison of the one or more regions of interest to the reference spectra of the selected compounds of the subset using a linear fitting model.

12. The method of claim 1 wherein the first X ray fluorescence spectrum of the compound is obtained by illuminating the compound with X ray radiation generated at the first voltage level of between 3 and 9 keV for 3 to 30 seconds using a first filter.

13. The method of claim 1 wherein the second X ray fluorescence spectrum of the compound is obtained by illuminating the compound with X ray radiation generated at the second voltage level of between 30 and 60 keV for 30 to 300 seconds using a second filter.

* * * * *